United States Patent [19]
Moore

[11] Patent Number: 5,900,922
[45] Date of Patent: May 4, 1999

[54] EYEWEAR HAVING A UNITARY FLEXIBLE FRAME AND AN INTERCHANGEABLE LENS

[75] Inventor: David Moore, Dallas, Tex.

[73] Assignee: Fossil, Inc., Richardson, Tex.

[21] Appl. No.: 08/914,380

[22] Filed: Aug. 18, 1997

[51] Int. Cl.$^6$ .................................................. G02C 1/04
[52] U.S. Cl. ........................... 351/103; 351/44; 351/108; 351/154
[58] Field of Search ............................. 351/44, 103, 106, 351/108, 131, 134, 124, 140, 149, 152, 154

[56] References Cited

U.S. PATENT DOCUMENTS

| | | | |
|---|---|---|---|
| 3,229,303 | 1/1966 | Jonassen | 2/14 |
| 3,453,042 | 7/1969 | Cooper | 351/41 |
| 3,542,460 | 11/1970 | Smith et al. | 351/92 |
| 3,552,840 | 1/1971 | Braget | 351/154 |
| 3,801,189 | 4/1974 | Bolle | 351/92 |
| 3,884,561 | 5/1975 | Kodys | 351/83 |
| 4,504,127 | 3/1985 | Cottet | 351/86 |
| 4,674,851 | 6/1987 | Jannard | 351/47 |
| 4,799,781 | 1/1989 | Weber | 351/86 |
| 4,828,355 | 5/1989 | Lipson et al. | 351/51 |
| 4,842,399 | 6/1989 | Tsai | 351/106 |
| 4,879,770 | 11/1989 | Vacilotto | 2/441 |
| 5,321,444 | 6/1994 | Lin | 351/86 |
| 5,428,407 | 6/1995 | Sheffield | 351/58 |
| 5,463,428 | 10/1995 | Lipton et al. | 351/158 |
| 5,467,148 | 11/1995 | Conway | 351/85 |
| 5,495,303 | 2/1996 | Kolentsi | 351/158 |
| 5,576,777 | 11/1996 | Gioacchini | 351/86 |
| 5,703,669 | 12/1997 | Park | 351/106 |

*Primary Examiner*—Huy Mai
*Attorney, Agent, or Firm*—Strasburger & Price,L.L.P.; Matthew J. Booth; John R. Emerson

[57] ABSTRACT

Glasses are described having a frame which accepts a lens. No screws or other fasteners are required. The lens fits within a first and second groove in the frame. A unitary lens design is preferred having a first and second lens portions. The lens can be tinted or clear, can contain corrective or noncorrective optics.

13 Claims, 4 Drawing Sheets

EYEWEAR HAVING A UNITARY FLEXIBLE FRAME AND AN INTERCHANGEABLE LENS

TECHNICAL FIELD OF THE INVENTION

The present invention relates to a pair of glasses having an interchangeable lens. The frame has a central portion and a nose piece, each with a groove which securely accepts the lens. The design allows for the easy interchange of various lens choices by the user.

BACKGROUND OF THE INVENTION

Glasses are essential for a large percentage of both children and adults. The glasses can be prescriptive to correct a visual defect, sunglasses to reduce eye fatigue and irritation from a bright sun, or both. Because of varying requirements, a person can own many pairs of glasses. This is expensive and can also be inconvenient. For example, a nearsighted person often carries both clear and tinted glasses. Sunglasses offer a wide variety of options as well. Some have a gray tint which merely reduces the amount of light transmitted to the eye. Other lenses can be tinted yellow to improve the visual contrast experienced by the wearer. Others prefer brown or even rose colored tints. Likewise, a single lens can be placed with various frame colors.

A need exists for a frame that allows the wearer to exchange lenses. The frame should provide a secure mount for the lens while also allowing its easy removal. U.S. Pat. No. 5,467,148 to Conway discloses an example of a frame system that allows for interchangeable lenses. The frame has a top frame and a rotatable nose piece. The nose piece has large lateral grooves. Two lenses are specially designed to engage the frame and nose piece. Each lens has two projections that fit notches in the frame. In other words, the system uses four separate pieces. If any one piece is damaged or lost, then the system will not work. Likewise, if the projections from either lens is broken, then the lens will not securely engage the frame. A need exists for a simpler frame system that provides the user with a secure method of attaching the lens to the frame.

SUMMARY OF THE INVENTION

The present invention relates to a frame and lens design. The frame is designed to accept a single lens element having two lens portions connected by a bridge. The lens element is secured within a flexible groove in the frame. The frame also contains a flexible nose piece which rests on the bridge of the user's nose. A variable groove is formed on the nose bridge for accepting the lens. This novel frame and lens design allows a user to switch between a variety of lens choices for a single frame, or conversely, to place a single lens with any of a variety of frame styles.

BRIEF DESCRIPTION OF THE DRAWINGS

The foreground aspects and other features of the present invention are explained in the following written description, taken in connection with the accompanying drawings, wherein.

DETAILED DESCRIPTION OF THE DRAWING

Figure 1:
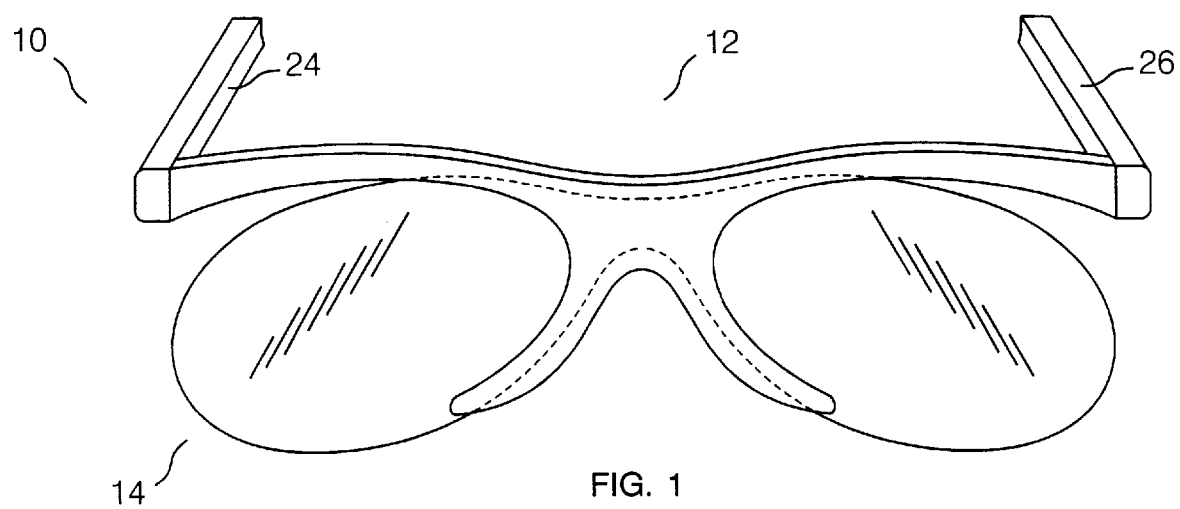
FIG. 1 is a perspective view of the frame and lens.
Figure 2:
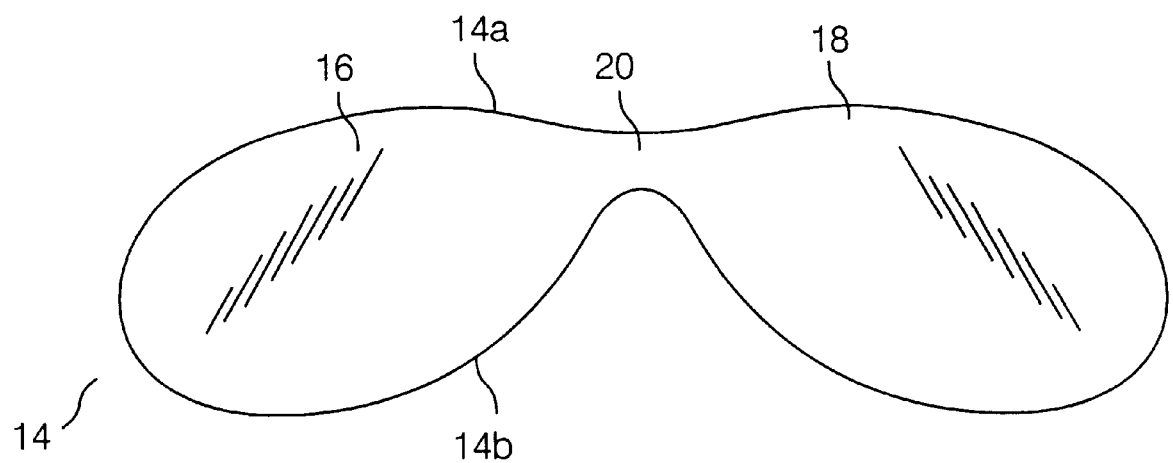
FIG. 2 front view of the unitary lens.
Figure 3:
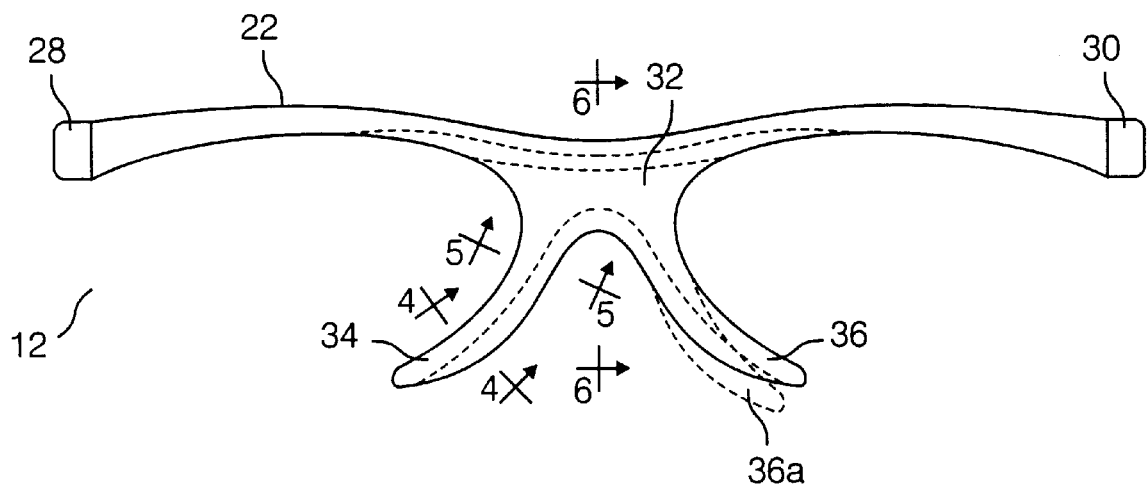
FIG. 3 is a front view of the frame.

A pair of glasses 10, shown in FIGS. 1, 2, and 3, illustrates an embodiment of the present invention. The glasses 10 have a frame 12 which is configured to accept a lens 14. The frame has a central support 22 with a centrally Located bridge 32. A nose piece having left and right sections 34, 36 extend downward from the bridge 32. The nose piece is shaped to complement the bridge of the wearer's nose and can be suitably deformable to accommodate a variety of nose shapes. For example, the nose piece is flexible between a first position as shown and a second position 36a as shown in phantom. The frame 12 also includes a pair of temple pieces 24, 26 pivotally attached to central support 22 at points 28, 30. In another embodiment, the temple pieces can be fixed to the support member. In one embodiment, the frame is made of a rubber coated aluminum. [Is this correct?]

The lens 14 for the present design is preferably a single element having a first and second lens portion 16, 18 connected by a neck 20. The lens portions 16, 18 can include corrective optics or can be tinted any suitable color. In one embodiment, the lens is made of polycarbonate. [Is this correct?] Each lens portion 16, 18 can be generally oval as shown; however, other shapes could be used including round or rectangular.

Figure 4:
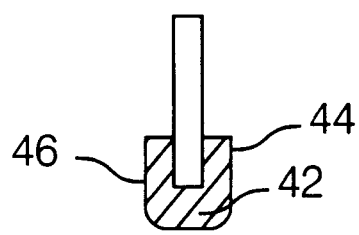
FIGS. 4, 5, and 6 are sectional views across sectional lines 4—4, 5—5, and 6—6, respectively, shown in FIG. 3.
Figure 5:
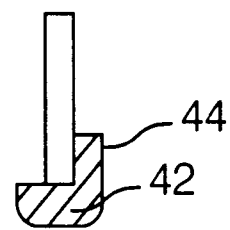
Figure 6:
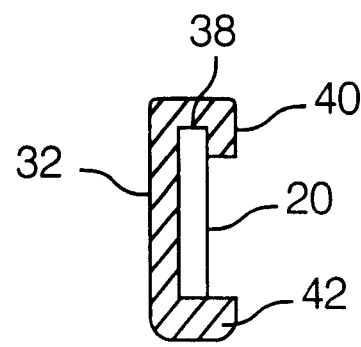

The lens 14 attaches to the frame by fitting snugly into a series of grooves in the frame. The upper edge 14a of the lens 14 complements a groove 38, best shown in FIG. 6. The groove 38 is further defined by ledge 42 and an upper rear flange 40. The lower edge 14b of the lens 14 rests on ledge 42. The distance between groove 38 and ledge 42 is dimensioned to approximately match the width of neck 20. The lower edge 14b of the lens 14 continues to engage the nose piece as shown in FIGS. 4 and 5. FIG. 5 is a sectional view across the nose piece along line 5—5 in FIG. 3. The lower edge 14b continues to rest on ledge 42 and is further supported by lower rear flange 44. Finally, the lower edge 14 is captured between a front lower flange 46 and the rear lower flange 44.

The groove system is designed to allow for the easy insertion or removal of a lens 14. Once inserted, the lens 14 should be properly positioned so that the wearer can see through the lens portions 16, 18. As mentioned above, the nose pieces 34, 36 can be flexible. This flexibility is useful during the insertion or removal of the lens from the frame. In practice, the upper edge 14a of the lens 14 is lodged into the groove 38. The lens is then rotated so that its lower edge 14b is adjacent to the ledge 42. The lens can be pushed into place over ledge 42. Then the remaining lower edge 14b of the lens 14 must be placed between lower front and lower rear flanges 44, 46 as shown in FIG. 4. This can be accomplished by slightly deforming the nose piece downward to, for example, position 36a shown in FIG. 3, allowing the lens to be rotated until it is centered between the flanges 44, 46. The nose piece is then returned to its natural position with the lens now captured between the flanges 44, 46.

It will be appreciated that the detailed disclosure has been presented by way of example only and is not intended to be limiting. Various alterations, modifications and improvements will readily occur to those skilled in the art and may be practiced without departing from the spirit and scope of the invention. The invention is limited only as required by the following claims and equivalents thereto.

I claim:

1. A pair of glasses comprising:

(a) a unitary flexible frame having a support and a nose piece, said frame having a groove; and (b) a lens with an upper and lower edge for engaging the groove, said lens removably attached to said frame.

2. The glasses of claim 1 wherein said support has a first groove for accepting the upper edge of the lens.

3. The glasses of claim 2 wherein said nose piece has a second groove for accepting the lower edge of the lens.

4. The glasses of claim 3 wherein said second groove comprises a bottom ledge.

5. The glasses of claim 3 wherein said second groove comprises a upper rear flange.

6. The glasses of claim 3 wherein said second groove comprises a lower rear flange.

7. The glasses of claim 3 wherein said second groove comprises a lower front flange.

8. The glasses of claim 1 wherein said frame further comprises temple pieces rotatably connected to the support.

9. The glasses of claim 1 wherein said lens is made of an optical material.

10. The glasses of claim 1 wherein said lens is tinted.

11. The glasses of claim 1 wherein said lens comprises a polycarbonate lens.

12. The glasses of claim 1 wherein said lens includes a first and second lens portions.

13. The glasses of claim 12 wherein said first and second lens portions are corrective.

* * * * *